B. O. DAHL.
TOBACCO SIZING MACHINE.
APPLICATION FILED MAR. 14, 1917.
1,265,180.
Patented May 7, 1918.
2 SHEETS—SHEET 1.
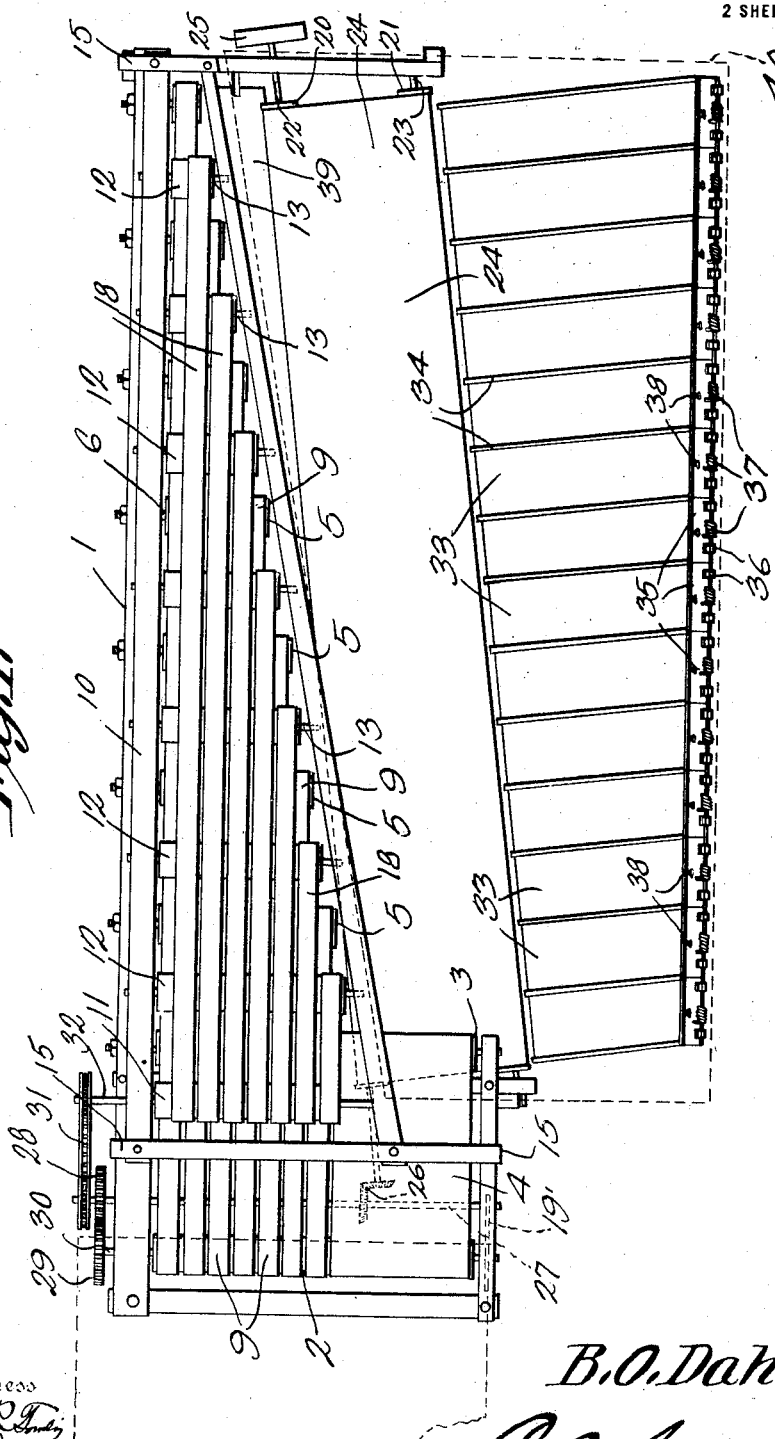
Inventor
B. O. Dahl,
By C. A. Snow & Co.
Attorney
Witness

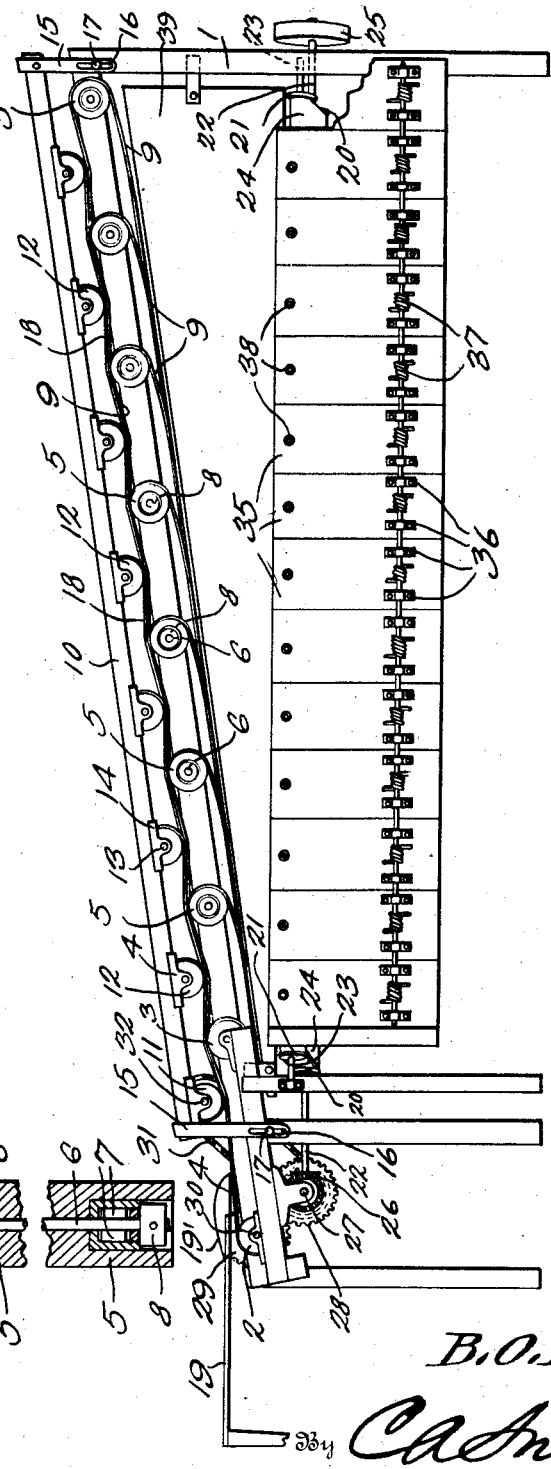

UNITED STATES PATENT OFFICE.

BERENT O. DAHL, OF VIROQUA, WISCONSIN.

TOBACCO-SIZING MACHINE.

1,265,180.　　　　　Specification of Letters Patent.　　Patented May 7, 1918.

Application filed March 14, 1917. Serial No. 154,758.

*To all whom it may concern:*

Be it known that I, BERENT O. DAHL, a citizen of the United States, residing at Viroqua, in the county of Vernon and State of Wisconsin, have invented a new and useful Tobacco-Sizing Machine, of which the following is a specification.

The present invention relates to a machine for sizing or assorting tobacco leaves and the like, and is particularly an improvement over the apparatus for sorting tobacco leaves disclosed in my Patent No. 645,703, granted March 20, 1900.

One of the objects of the invention is the provision of novel arrangement of the leaf conveying belts, whereby a larger assortment of the leaves is possible.

Another object of the invention is the provision of the conveyer belts and their rollers so arranged, as to grip the leaves for moving them with the belts, without danger of tearing or otherwise injuring the leaves.

A further object of the invention is the provision of means for moving and directing the leaves away from the sizinz belts, into the receptacles or bins so that the butt ends of the leaves are even.

It is also the object of the invention to provide a machine of the nature indicated improved generally in its construction and details, to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:

Figure 1 is a plan view of the machine, portions being shown in dotted lines instead of full lines, to illustrate the parts underneath.

Fig. 2 is a side elevation of the machine.

Fig. 3 is a sectional detail illustrating the mounting of one of the lower rollers.

The machine embodies a suitable frame 1 constructed of wood or other suitable material, and a pair of transverse rollers 2—3 is carried by the frame at the receiving or feeding end thereof, and a relatively wide inlet feeding apron 4 is trained around said rollers adjacent to the forward ends thereof. A longitudinal series of transverse rollers 5 is carried by the upper portion of the frame, and the rollers 5 with the rollers 2 and 3 are arranged in an inclined plane extending from the receiving to the opposite end of the frame. The rear ends of the rollers 2, 3 and 5 are preferably on a longitudinal line, and the rollers 5 decrease in length from the roller 3 to the opposite end of the frame, so that the forward ends of the rollers 5 are on an oblique line.

In order to mount the rollers 5 without the frame encumbering the forward ends thereof, forwardly projecting spindles 6 are carried by the rear portion of the frame 1, and said rollers are mounted upon the spindles 6, preferably by means of anti-frictional or roller bearings 7. The rollers 5 are held upon the spindles 6 by means of collars or other suitable retaining elements 8 engaged to the forward free ends of said spindles.

A set of longitudinal transversely spaced belts 9 is trained around the rollers 5 and the roller 2, and said endless conveyer belts increase in length from the forward to the rear belt. The belts 9 are all trained around the roller 2 at the receiving end of the machine, and the opposite end of shorter forward belt 9 is trained around the first roller 5, the next belt 9 is trained around the next roller 5, and so on, so that those portions of the belts 9 remote from the roller 2 terminate in a stepped relation. The spaces between the belts 9 are of less width than the width of said belts.

An upper set of endless conveyer belts is disposed above the set of belts 9, and for this purpose, a substantially triangular secondary or supplemental frame 10 is disposed above the belts 9, and a transverse roller 11 is mounted within the larger end of the frame 10 which is nearest the receiving end of the machine. A set of transverse longitudinally spaced rollers 12 is mounted within the frame 10, and said rollers decrease in length from the roller 11 to the smaller end of the frame 10, substantially the same as the rollers 5, the forward ends of the rollers 12 being on an oblique line or in stepped arrangement. The shafts or axles 13 of the rollers 12 are journaled in bearings 14 carried by the frame 10. The frame 10 is carried for vertical adjustment by the main frame 1, and for this purpose, the frame 10 is provided with depending bars 15 overlapping the main frame and provided with vertical slots 16 receiving bolts or clamping elements 17 carried by the main frame. When these bolts are loosened, the secondary frame can be adjusted vertically. This frame 10 is inclined the same as the lower set of rollers, whereby the upper set of rollers is also inclined. A plurality of longitudinal transversely spaced conveyer belts 18 are trained around the roller 11 and rollers 12, said endless belts 18 increasing in length from the forward to the rear one, the same as the belts 9, and the belts 18 are in stepped arrangement the same as the forward ends of the rollers 12. The rollers of the upper set are disposed in staggered arrangement relative to the rollers of the lower set, whereby when the frame 10 is lowered, the rollers of the two sets will press the belts of the opposite sets between the rollers thereof, as seen in Fig. 2, in order that the belts will be held taut, and this will hold the adjacent runs of the belts together, in order to grip the tobacco leaves and convey them along the belts without the danger of the leaves being torn or otherwise mutilated.

Importance is also attached to the fact that the belts of the upper and lower sets are in staggered relation, it being noted that each belt of each set has its edges overlapping the edges of two belts of the other set. This increases the sizing capacity of the machine as will hereinafter more fully appear.

A feeding table 19 overhangs the roller 2 for feeding the tobacco leaves onto the lower apron 4 and belts 9. This table 19 is provided with a gage and stop 19′ at its forward edge, against which the butt ends of the leaves are brought as they are moved from the table onto the apron 4. The tips of the leaves of different lengths are therefore brought onto the respective belts 9, according to the lengths of the leaves, as disclosed in said patent.

A means is provided for conveying the leaves to one side as they are released from the belts 9 and 18. Thus, an oblique roller 20 is disposed substantially underneath the forward ends of the rollers, and a roller 21 is disposed in front of and parallel with the roller 20, and is slightly higher up than the roller 20, as seen in Fig. 2, whereby the endless apron 24 which is trained about the rollers is inclined slightly from the roller 20 to the roller 21. The apron 24 is comparatively wide so as to extend across the ends of the rollers 5 and 12. The rollers 20 and 21 are substantially horizontal. The rollers 20 and 21 are carried by the respective shafts 22 and 23 journaled in the main frame 1, and a pulley 25 is secured to that end of the shaft 22 remote from the feeding end of the machine, whereby power can be applied to the shaft 22 for actuating the apron 24 and the other working parts.

The opposite end of the shaft 22 is connected by bevel gears 26 with a transverse counter shaft 27 journaled in the frame near the receiving end thereof, and the shaft 27 has a spur gear 28 thereon meshing with a spur gear 29 secured upon the rear end of the shaft 30 of the roller 2, whereby to actuate the apron 4 and belts 9. The counter shaft 27 is also connected by a sprocket chain 31 with the shaft 32 of the roller 11 to actuate the belts 18 which are all trained around the roller 11 and the individual rollers 12.

The receiving portion of the apron 24 is below the forward ends of the rollers 5 and 12, and a longitudinal series of receptacles or bins 33 is located adjacent to the discharge end of the apron 24, said receptacles being separated by partitions 34. The receptacles 33 are arranged according to the rollers 5 and 12, there being one of said receptacles for each of said rollers, or for each of the belts 9 and 18 of the two sets. There are therefore twice the number of receptacles in the present construction as that shown in the patented one, but practically the same number of conveyer belts are used. Upwardly projecting doors 35 are provided for the forward open ends of the receptacles 33 and have their lower ends hinged, as at 36. Springs 37 are used for swinging the doors 35 upwardly to closed position, and said doors have suitable knobs or handles 38, whereby the doors can be swung forwardly and downwardly for conveniently removing the assorted leaves from the receptacles.

An inclined chute 39 of triangular form is disposed underneath the forward ends of the rollers 5 and 12 and extends to the rear portion of the belt 24 and the rear roller 20.

A table 40, shown in dotted lines only, can be disposed above the receptacles 33 and belt 24 for handling the bunches of leaves as they are withdrawn from the receptacles 33, thus providing for economy in space, since the table 40 can be provided above the machine without using separate space therefor, and the leaves can be readily placed on the table 40 after they are removed from the receptacles.

In operation, the tobacco leaves are placed upon the feed table 19 with their butt ends against the gage or stop 19′ and are moved from said table onto the feed apron 4, and the leaves are conveyed by the apron 4 and belt 9 underneath the receiving portions of the belts 18 where the tips of the leaves are gripped between the upper and lower belts and conveyed rearwardly therewith. The shortest leaves are dropped from the apron 4 to pass into the first receptacle 33, and the next size of leaves whose tips terminate between the first or front belts 9 and 18 are released at the delivery portion of the first belt 18, so as to pass into the second receptacle 33. The next size of leaves which have their tips gripped between the first belt 9 and second belt 18 are released at the delivery portion of the said first belt 9. Thus, the leaves are released at the various longitudinal points in proportion to their lengths, the shorter leaves being released first and the longer leaves being carried rearwardly farther by the belts, due to the tips of the longer leaves extending between and being gripped by the belts 9 and 18 at the rear which are longer. Due to the fact that each of the belts 9 and 18 overlaps and coöperates with a pair of the opposite belts, this increases the sizing or assorting capacity of the machine. Thus, the graduated sizes are alternately released from the upper and lower belts, instead of from the pairs of upper and lower belts as in said patent, a receptacle 33 being provided for each of the belts 9 and 18 instead of one receptacle for each upper and lower pair, thus doubling the sizing capacity. The delivery portions of the upper and lower belts are in stepped arrangement, as seen in Fig. 1, which in connection with the transverse staggered arrangement of the upper and lower belts, provides for the increased efficiency of the apparatus. The chute 39 increases in height from the receiving to the delivery end of the machine, whereby the leaves in hinging farther down from the belts toward the delivery end of the machine, rest against the chute 39. Said chute is increased in height toward the delivery end of the machine in proportion to the increased lengths of the leaves hanging from and released from the belts. The leaves from the smaller to the larger sizes are released at predetermined points of the chute 39, and in hanging downwardly against said chute with their butt ends lowermost, will, when released, slide onto the receiving portion of the apron 24. The adjacent runs of the belts 9 and 18 move away from the receiving end of the machine, while the upper run of the apron 24 moves away from the belts to carry the leaves toward the respective receptacles 33. The leaves are moved sufficiently fast by the apron 24, in order that the momentum of the leaves will carry them across the mouths of the receptacles 33 against the doors 35, the butt ends of the leaves abutting against said doors to bring them even. The leaves after striking the doors 35 drop downwardly within the receptacles or pockets, thus piling the leaves within the receptacles with their butt ends even. The apron 24 thus serves to place the leaves properly in their receptacles or pockets, and by swinging the doors 35 of the receptacles forwardly and downwardly, the leaves can be readily removed therefrom in bunches.

It is to be noted the leaves in being placed on the belt 4 with their butt ends at that edge of said belt nearest the observer, (referring to Fig. 1), the butt ends of the leaves will project from the conveyer belts and drop onto the apron 24, which tends to move the leaves from between the conveyer belts as said belts move the leaves therewith. This creates a light tension on the leaves, due to their frictional engagement with the apron, and as soon as the leaves are released, they will be moved by the apron into the proper receptacles. The delivery portions of the belts and apron 24 are spaced apart an increasing distance from the receiving to the delivery portions of said belts, whereby only the end portions of the leaves can rest on the apron 24. This prevents the longer leaves from having too great a bearing on the apron, which might prove injurious, either tearing the leaves or pulling them from the belts prematurely.

Having thus described the invention, what is claimed as new is:—

1. A sizing machine embodying two sets of belts for conveying articles therebetween, the delivery portions of the belts of each set being in stepped arrangement, the belts of the two sets being in staggered arrangement transversely thereof, and the delivery portions of the belts of one set terminating between the delivery portions of the belts of the other set, so as to release the articles alternately from the belts of the two sets.

2. A sizing machine embodying two sets of conveying belts having their delivery portions in stepped arrangement, and each belt having its edges overlapping the edges of two belts of the other set to release the articles alternately from the belts of the two sets.

3. A sizing machine embodying a main frame, a series of rollers carried thereby, endless conveyer belts trained around said rollers, a secondary frame carried adjustably by the main frame, a series of rollers carried by the secondary frame, endless conveyer belts trained around the second mentioned set of rollers, the belts of the two sets having their delivery portions in stepped arrangement, and the rollers of the two series being in staggered arrangement to press the opposite belts between their rollers.

4. A sizing machine embodying a frame, forwardly projecting spindles carried thereby, rollers rotatable upon said spindles with their forward ends unencumbered, conveyer belts trained around said rollers, other rollers mounted above the aforesaid rollers, conveyer belts trained around the second mentioned rollers coöperating with the aforesaid belts, the delivery portions of said belts being in stepped arrangement, and means for receiving articles from the delivery portions of said belts below the forward ends of the first mentioned rollers.

5. A sizing machine embodying conveyer belts having their delivery portions in stepped arrangement, an endless apron having its receiving portion below said delivery portions of the belts for the engagement of the projecting ends of the articles held between said belts, said apron being movable away from said delivery portions and tending to withdraw the articles from said belts, and receptacles adjacent to the delivery portion of said apron for receiving the articles therefrom and provided opposite to said apron with doors to open away from said apron and against which the articles are moved into the receptacles from said apron.

In testimony that I claim the foregoing as my own, I have hereto affixed my signature in the presence of two witnesses.

BERENT O. DAHL.

Witnesses:
A. HEINZ,
F. H. GRAVES.

Copies of this patent may be obtained for five cents each, by addressing the "Commissioner of Patents, Washington, D. C."